United States Patent
Kim

(10) Patent No.: US 11,924,287 B2
(45) Date of Patent: Mar. 5, 2024

(54) METHOD FOR MANAGING SESSION

(71) Applicant: LG Electronics Inc., Seoul (KR)

(72) Inventor: Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/102,946

(22) Filed: Jan. 30, 2023

(65) Prior Publication Data

US 2023/0179663 A1  Jun. 8, 2023

Related U.S. Application Data

(63) Continuation of application No. PCT/KR2021/009953, filed on Jul. 30, 2021.

(30) Foreign Application Priority Data

Jul. 30, 2020 (KR) .................. 10-2020-0094933

(51) Int. Cl.
H04L 67/143 (2022.01)
H04W 24/10 (2009.01)

(52) U.S. Cl.
CPC ........... *H04L 67/143* (2013.01); *H04W 24/10* (2013.01)

(58) Field of Classification Search
CPC ...... H04L 67/143; H04W 24/10; H04W 24/08
See application file for complete search history.

(56) References Cited

U.S. PATENT DOCUMENTS

| 2015/0295693 | A1* | 10/2015 | Kwong | H04W 52/0229 370/329 |
| 2017/0359749 | A1* | 12/2017 | Dao | H04L 47/2416 |
| 2020/0221527 | A1* | 7/2020 | Bharatia | H04W 76/16 |
| 2020/0358689 | A1* | 11/2020 | Lee | H04L 43/028 |
| 2021/0144579 | A1* | 5/2021 | Ke | H04W 28/0864 |

FOREIGN PATENT DOCUMENTS

| WO | WO 2019/032968 | 2/2019 |
| WO | WO 2019/219619 | 11/2019 |

OTHER PUBLICATIONS

"3GPP TSG-SA WG2 Meeting #139E, Jun. 1-12, 2020, Elbonia, S2-2003899, CATT, KI#16, New solution for KI#16: NWDAF assisted UP optimization for EC" (Year: 2020).*
"SA WG2 Meeting #139E e-meeting, S2-2004563, Elbonia, Jun. 1-12, 2020, Huawei, KI #10 and #16, New Sol: Solution for NWDAF assisted UP optimization for edge computing" (Year: 2020).*

(Continued)

Primary Examiner — Walli Z Butt
Assistant Examiner — Thad N Defauw
(74) Attorney, Agent, or Firm — Fish & Richardson P.C.

(57) ABSTRACT

One disclosure of the present specification provides a method by which a session management function (SMF) performs communication. The method comprises the steps of: sending an analytics request message to a network data analytics function (NWDAF), the request message including a data network name (DNN) and single network slice selection assistance information (S-NSSAI); receiving analytics from the NWDAF; determining a deactivation timer value on the basis of the analytics; and transmitting the deactivation timer value to a user plane function (UPF).

13 Claims, 10 Drawing Sheets

(56) References Cited

OTHER PUBLICATIONS

3GPP, "3rd Generation Partnership Project; Technical Specification Group Services and System Aspects; Architecture enhancements for 5G System (5GS) to support network data analytics services (Release 16)," TS 23.288 V16.4.0, Jul. 2020, 66 pages.
CATT, "KI#16, New solution for KI#16: NWDAF assisted UP optimization for EC," S2-2003899, Presented at 3GPP TSG-SA WG2 Meeting #139E, Jun. 1-12, 2020, Elbonia, 4 pages.
Huawei & HiSilicon, "KI #10 & #16, New Sol: Solution for NWDAF assisted UP optimization for edge computing," S2-2004563, Presented at SA WG2 Meeting #139E e-meeting, Elbonia, Jun. 1-12, 2020, 6 pages.

* cited by examiner

FIG. 7

| Octets | 8 7 6 5 4 3 2 1 |
|---|---|
| 1 to 2 | Type = 117 (decimal) |
| 3 to 4 | Length = n |
| 5 to 8 | User Plane Inactivity Timer |
| 9 to (n+4) | These octet(s) is/are present only if explicitly specified |

METHOD FOR MANAGING SESSION

CROSS-REFERENCE TO RELATED APPLICATIONS

Pursuant to 35 U.S.C. § 119(e), this application is a continuation of International Application PCT/KR2021/009953, with an international filing date of Jul. 30, 2021, which claims the benefit of Korean Patent Application No. 10-2020-0094933, filed on Jul. 30, 2020, the contents of which are hereby incorporated by reference herein in their entirety.

TECHNICAL FIELD

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

If there is no data transmission for a certain period of time in a session (PDU session), the SMF may terminate the corresponding session. That is, the user plane connection of the corresponding session may be deactivated. At this time, properly setting the certain period of time for each session is required for efficient communication.

SUMMARY

The SMF may receive analytics from NWDAF and, based on this, determine an appropriate deactivation timer value suitable for the session.

The specification may have various effects.

For example, through the procedure disclosed herein, the SMF may determine an appropriate inactivity timer for the PDU session to efficiently manage user plane resources to provide an optimized UP.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 7 shows a UP deactivation timer.

DETAILED DESCRIPTION

Figure 1:
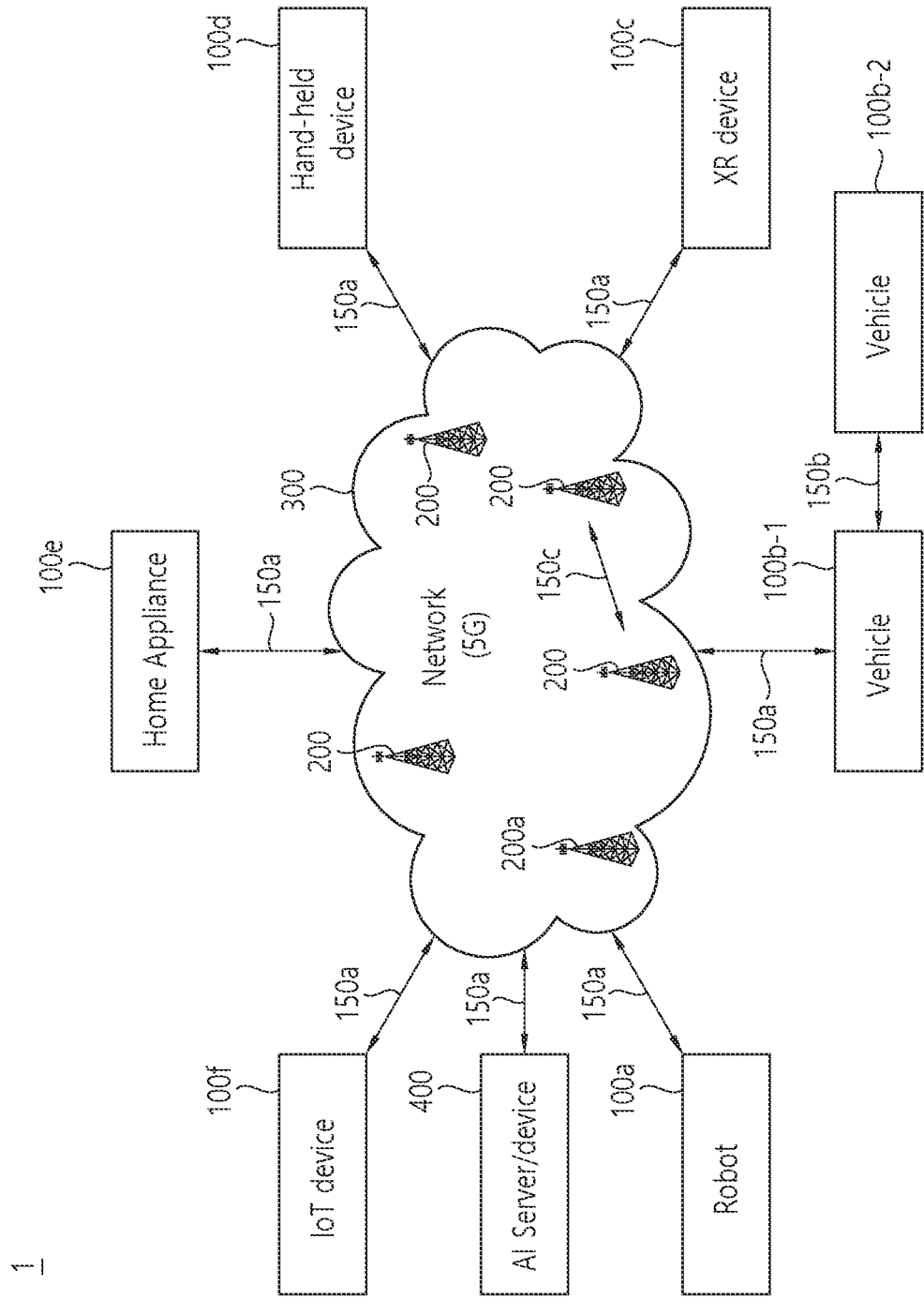
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example. "A/B" may mean "A and/or B". Accordingly, "A/B" may mean "only A". "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example" In detail, when it is shown as "control information (PDCCH)", "PDCCH" may be proposed as an example of "control information", In other words, "control information" in the present disclosure is not limited to "PDCCH", and "PDDCH" may be proposed as an example of "control information". In addition, even when shown as "control information (i.e., PDCCH)". "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 50 include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 50 new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAM) (e.g., a drone). The XR device may include an AR/VR/Mixed Reality (MR) device and may be implemented in the form of ahead-mounted device (HMD), ahead-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g. vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images, AR, technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrow band internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
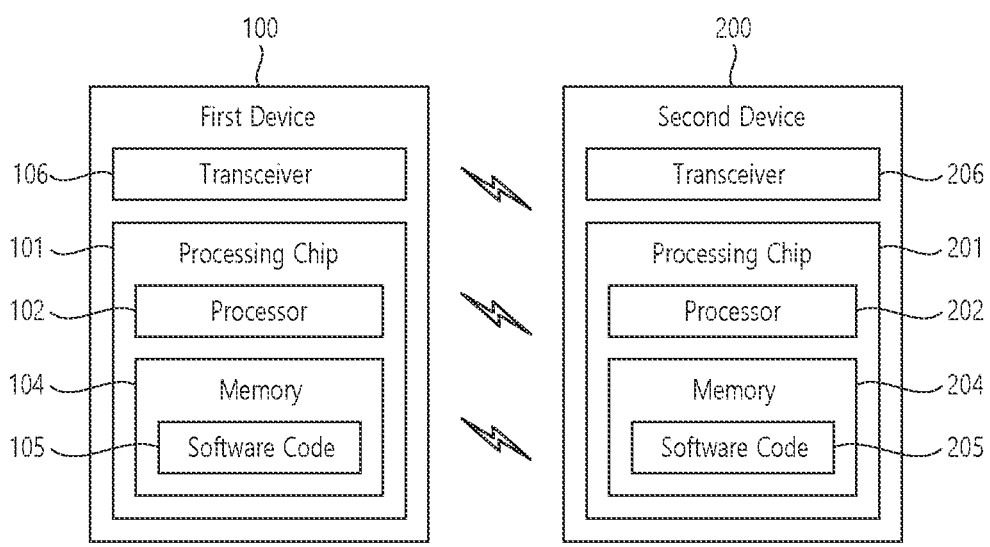
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EP ROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
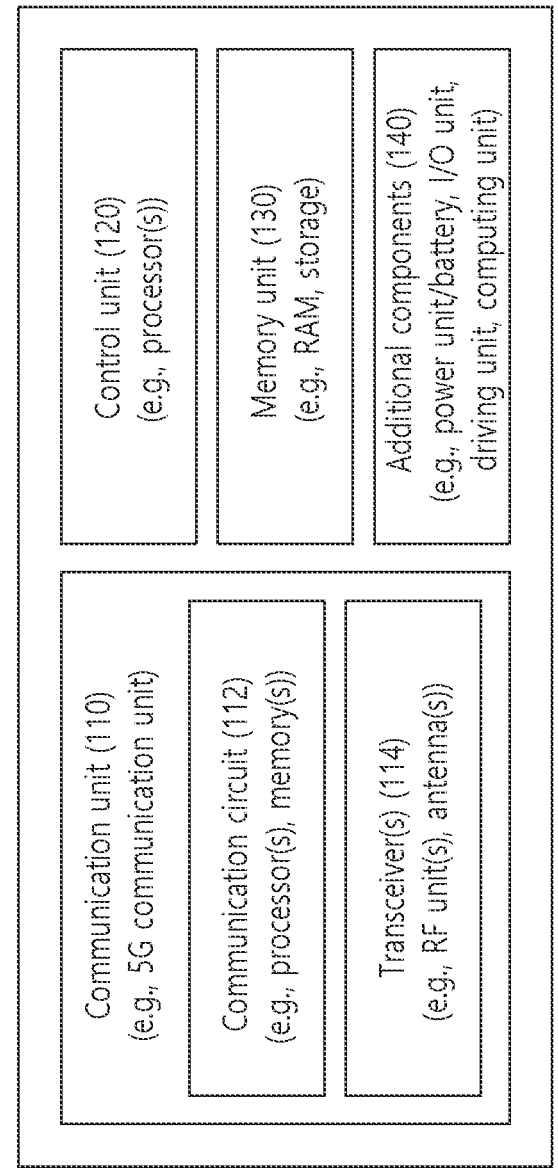
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 11) a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
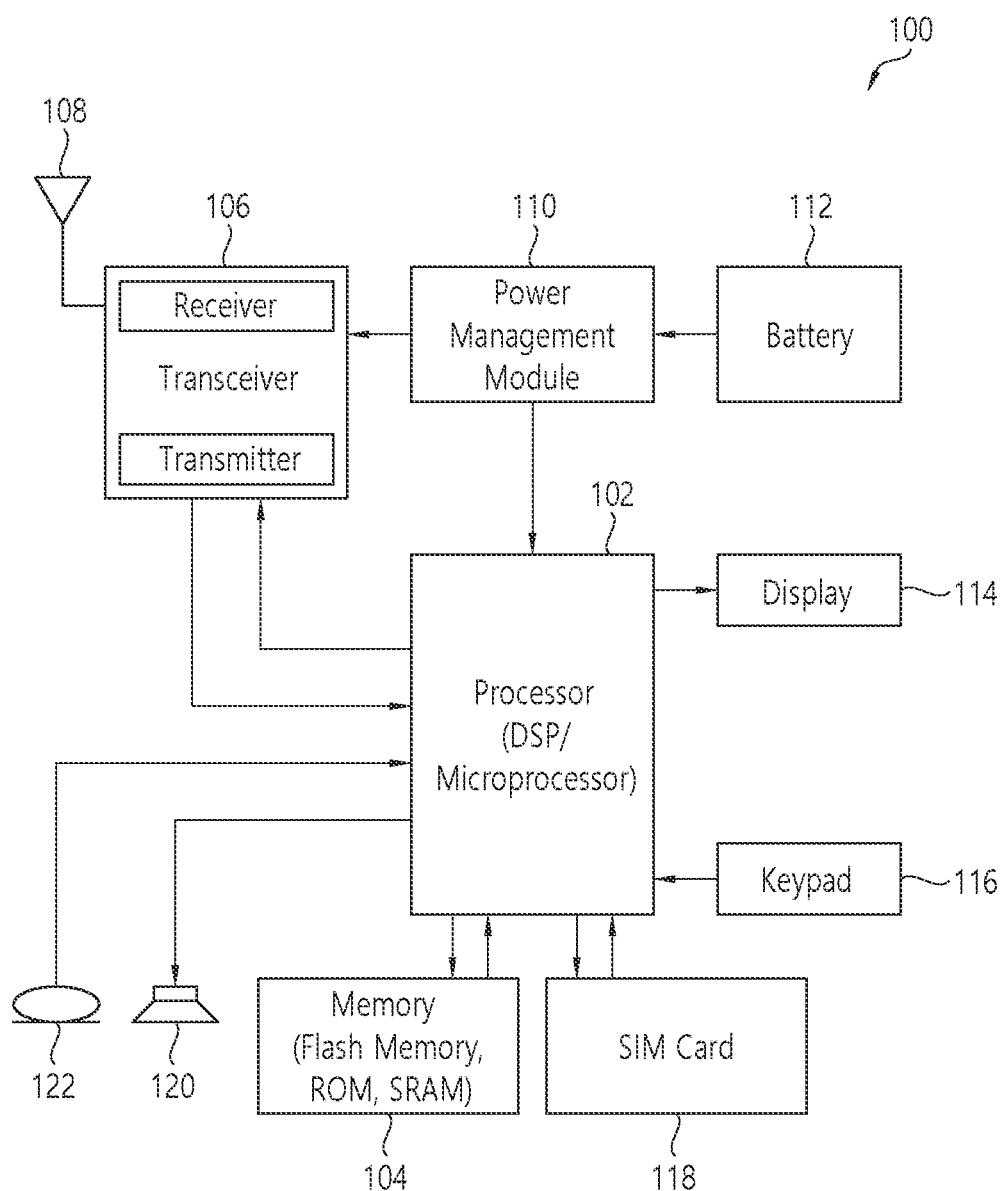
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor The processor 102 may include at least one of a digital signal processor (DSP), a central processing unit (CPU), a graphics processing unit (GPU) a modem (modulator and demodulator). An example of the processor 102 may be found in SNAPDRAGON™ series of processors made by Qualcomm®, EXYNOS™ series of processors made by Samsung®, a series of processors made by Applet, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
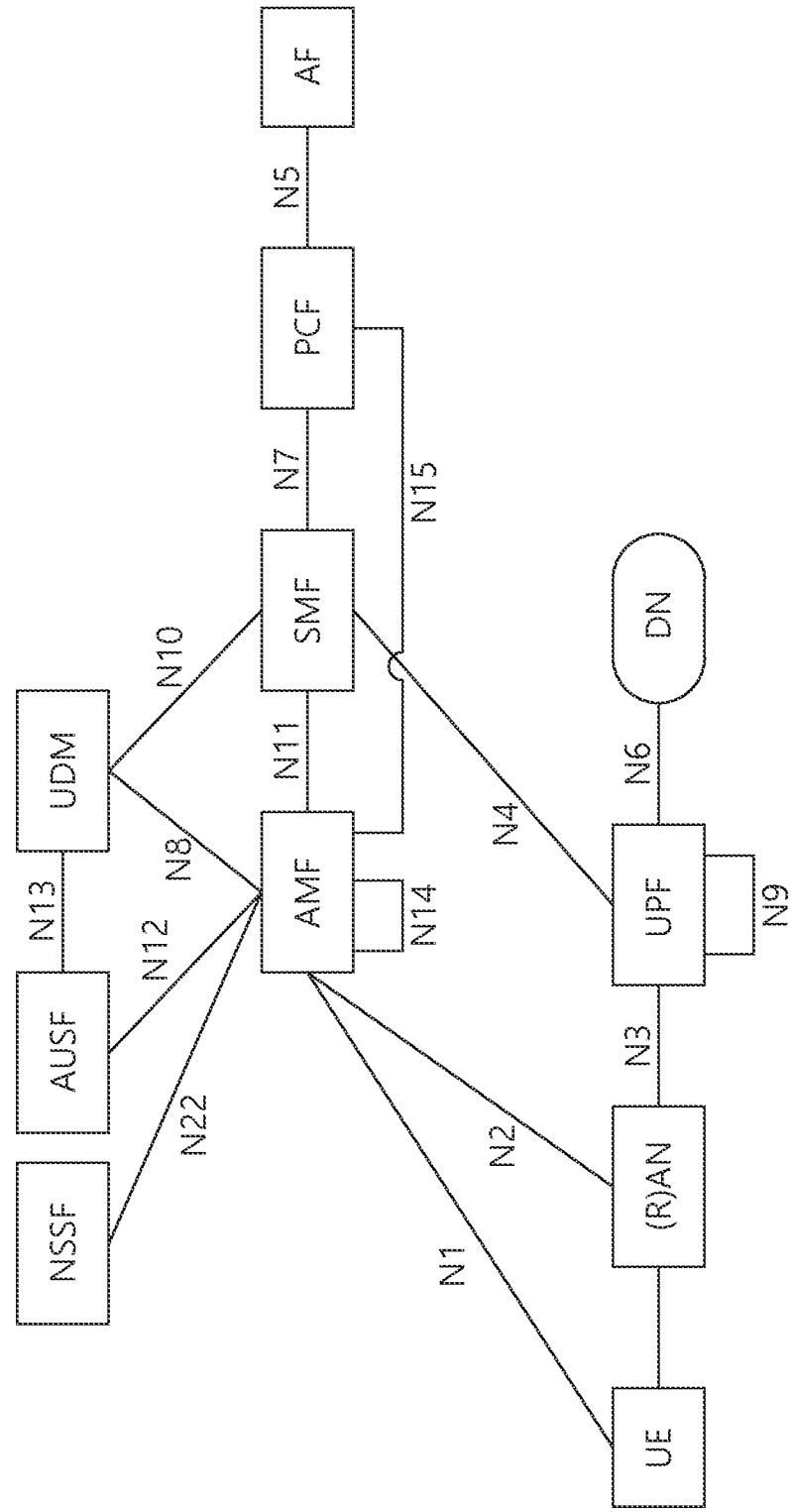
FIG. 5 shows an example of a 5G system architecture to which the implementation of the present specification is applied.

FIG. 5 shows an example of a 5G system architecture to which the implementation of the present specification is applied.

The 5G system (5G; 5G system) structure consists of the following network functions (NFs).

AUSF (Authentication Server Function)
AMF (Access and Mobility Management Function)
DN (Data Network), e.g., operator services, internet access or third-party services
USDF (Unstructured Data Storage Function)
NEF (Network Exposure Function)
I-NEF (Intermediate NEF)
NRF (Network Repository Function)
NSSF (Network Slice Selection Function)
PCF (Policy Control Function)
SMF (Session Management Function)
UDM (Unified Data Management)
UDR (Unified Data Repository)
UPF (User Plane Function)
UCMF (UE radio Capability Management Function)
AF (Application Function)
UE (User Equipment)
(R)AN ((Radio) Access Network)
5G-EIR (5G-Equipment Identity Register)
NWDAF (Network Data Analytics Function)
CHF (Charging Function)

In addition, the following network functions may be considered.

N3IWF (Non-3GPP InterWorking Function)
TNGF (Trusted Non-3GPP Gateway Function)
W-AGF (Wireline Access Gateway Function)

FIG. 5 shows the 5G system structure of a non-roaming case using a reference point representation that shows how various network functions interact with each other.

In FIG. 5, UDSF, NEF and NRF are not described for clarity of the point-to-point diagram. However, all network functions shown may interact with UDSF, UDR, NEF and NRF as needed.

For clarity, the connection between the UDR and other NFs (e.g., PCFs) is not shown in FIG. 5. For clarity, the connection between NWDAF and other NFs (e.g. PCFs) is not shown in FIG. 5.

The 5G system architecture includes the following reference points.

N1: the reference point between the UE and the AMF.
N2: reference point between (R)AN and AMF,
N3: Reference point between (R)AN and UPF.
N4: reference point between SMF and UPF.
N6: Reference point between UPF and data network,
N9: reference point between two UPFs.

The following reference points show the interactions that exist between NF services in NF.

N5: Reference point between PCF and AF.
N7: reference point between SMF and PCF.
N8: reference point between UDM and AMF.
N10: reference point between UDM and SMF.
N11: reference point between AMF and SMF.
N12: reference point between AMF and AUSF.
N13: reference point between UDM and AUSF.
N14: reference point between two AMFs.
N15: Reference point between PCF and AMF in case of non-roaming scenario, and reference point between PCF and AMF of visited network in case of roaming scenario.
N16: reference point between two SMFs (in case of roaming, between the SMF of the visited network and the SMF of the home network)
N22: reference point between AMF and NSSF.

In some cases, it may be necessary to connect two NFs to each other to service the UE.

<Deactivation of UP Connection for an Established PDU Session>

Selective activation and deactivation of the UP connection of the existing PDU Session may be performed.

A UE may establish multiple PDU sessions. Activating the UP connection of the existing PDU session may activate the UE-CN user plane connection (i.e., data radio bearer and N3 tunnel).

For the UE in the CM-IDLE state in 3GPP access, either UE or Network-Triggered Service Request procedure may support independent activation of UP connection of existing PDU Session. For the UE in the CM-IDLE state in non-3GPP access, UE-Triggered Service Request procedure allows the re-activation of UP connection of existing PDU Sessions, and may support independent activation of UP connection of existing PDU Session.

A UE in the CM-CONNECTED state invokes a Service Request procedure to request the independent activation of the UP connection of existing PDU Sessions.

Network Triggered re-activation of UP connection of existing PDU Sessions is handled as follows:

If the UE CM state in the AMF is already CM-CONNECTED on the access (3GPP, non-3GPP) associated to the PDU Session in the SMF, the network may re-activate the UP connection of a PDU Session using a Network Initiated Service Request procedure.

Otherwise:

If the UE is registered in both 3GPP and non-3GPP accesses and the UE CM state in the AMF is CM-IDLE in non-3GPP access, the UE can be paged or notified through the 3GPP access for a PDU Session associated in the SMF (i.e. last routed) to the non-3GPP access:

If the UE CM state in the AMF is CM-IDLE in 3GPP access, the paging message may include the access type associated with the PDU Session in the SMF. The UE, upon reception of the paging message containing an access type, shall reply to the 5GC via the 3GPP access using the NAS Service Request message, which shall contain the list of PDU Sessions associated with the received access type and whose UP connections can be re-activated over 3GPP (i.e. the list does not contain the PDU Sessions whose UP connections cannot be re-activated on 3GPP based on UE policies and whether the S-NSSAIs of these PDU Sessions are within the Allowed NSSAI for 3GPP access). If the PDU Session for which the UE has been paged is in the list of the PDU Sessions provided in the NAS Service Request and the paging was triggered by pending DL data, the 5GC shall re-activate the PDU Session UP connection over 3GPP access. If the paging was triggered by pending DL signaling, the Service Request succeeds without re-activating the PDU session UP connection over the 3GPP access and the pending DL signaling is delivered to the LIE over the 3GPP access;

If the UE CM state in the AMF is CM-CONNECTED in 3GPP access, the notification message shall include the non-3GPP Access Type. The UE, upon reception of the notification message, shall reply to the 5GC via the 3GPP access using the NAS Service Request message, which shall contain the List of Allowed PDU Sessions that can be re-activated over 3GPP or an empty List of Allowed PDU Sessions if no PDU Sessions are allowed to be re-activated over 3GPP access.

NOTE: A UE that is in a coverage of a non-3GPP access and has PDU Session(s) that are associated in the UE (i.e. last routed) to non-3GPP access, is assumed to attempt to connect to it without the need to be paged.

If the UE is registered in both 3GPP and non-3GPP accesses served by the same AMF and the UE CM state in the AMF is CM-IDLE in 3GPP access and is in CM-CONNECTED in non 3GPP access, the UE can be notified through the non-3GPP for a PDU Session associated in the SMF (i.e. last routed) to the 3GPP access. The notification message shall include the 3GPP Access Type. Upon reception of the notification message, when 3GPP access is available, the UE shall reply to the 5GC via the 3GPP access using the NAS Service Request message.

In addition to the above, a PDU Session may be established as an always-on PDU Session The deactivation of the UP connection of an existing PDU Session causes the corresponding data radio bearer and N3 tunnel to be deactivated. The UP connection of different PDU Sessions can be deactivated independently when a UE is in CM-CONNECTED state in 3GPP access or non-3GPP access, At the deactivation of the UP of a PDU Session using a N9 tunnel whose end-point is controlled by an I-SMF, the N9 tunnel is preserved. If a PDU Session is an always-on PDU Session, the SMF should not deactivate a UP connection of this PDU Session due to inactivity.

Figure 6:
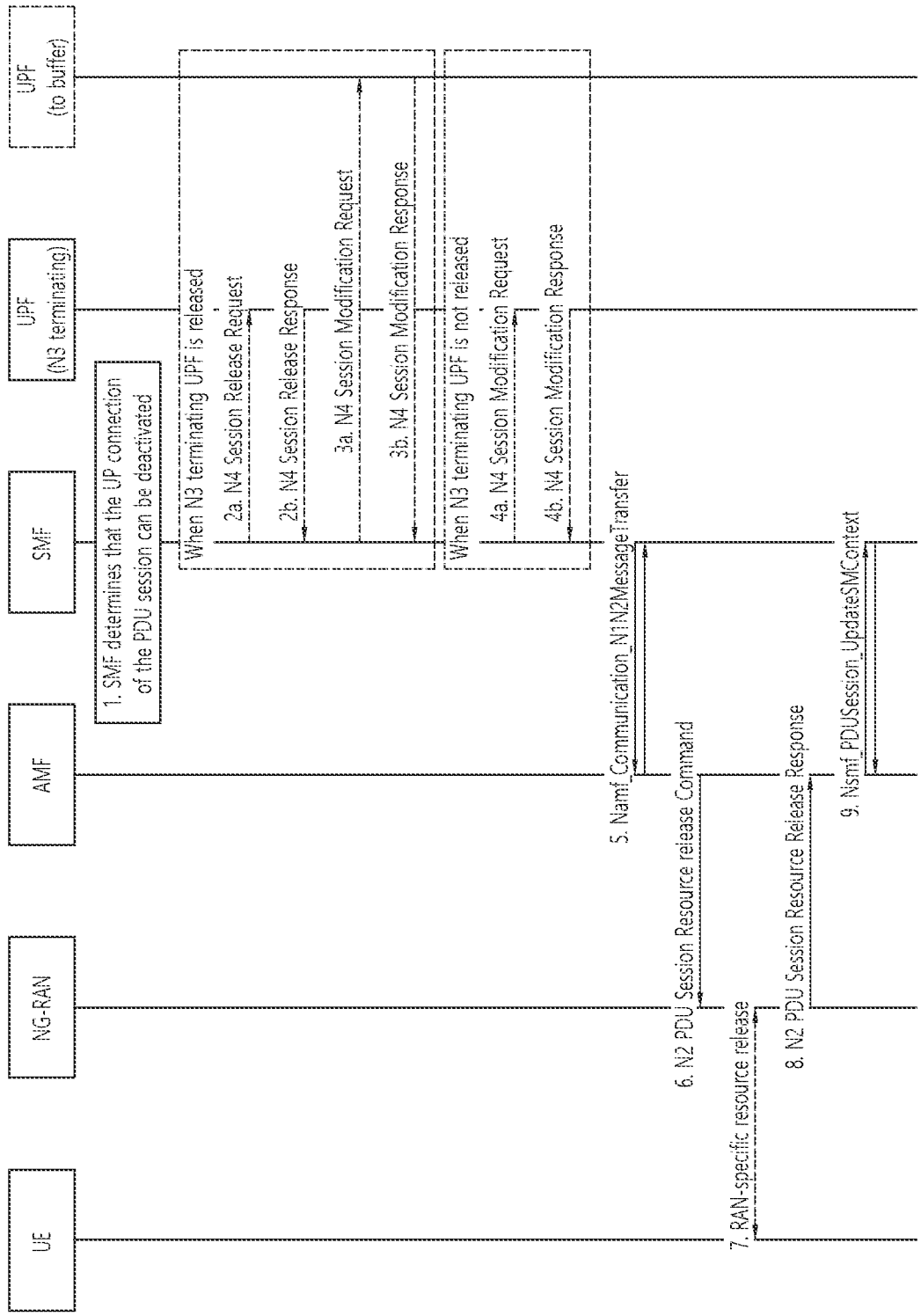
FIG. 6 shows deactivation of UP connections for PDU sessions.

FIG. 6 shows deactivation of UP connections for PDU sessions.

UP connection (i.e. data radio bearer and N3 tunnel) for an established PDU Session of a UE in CM-CONNECTED state may be deactivated.

1. The SMF may determine that the UP connection of the PDU Session can be deactivated in following cases:

During handover procedure, if all the QoS Flows of a PDU Session are rejected by the target NG-RAN, or if a PDU Session is failed to setup indicated by the A F. SMF proceeds with step 2 and step 3, the steps 5 to 9 may be skipped;

The UPF may detect that the PDU Session has no data transfer for a specified Inactivity period;

For a LADN PDU Session, the AMF may notify to the SMF that the UE moved out of the LADN service area; or The AMF may notify to the SMF that the UE moved out of the Allowed Area.

The SMF may decide to release the UPF of N3 terminating point. In that case the SMF proceeds with step 2 and step 3. Otherwise, if the SMF decides to keep the UPF of N3 terminating points, the SMF proceeds with step 4.

2. The SMF may initiate an N4 Session Release procedure to release the intermediate UPF of N3 terminating point. If there are multiple intermediate UPFs, this step can be performed for each UPFs to be released. The SMF needs to initiate N4 Session Modification procedure to the UPF (i.e. N9 terminating point or PDU Session Anchor) connecting to the released UPF in step 3.

3. If the intermediate UPF(s) of N3 terminating point is released in step 2, the SMF may initiate an N4 Session Modification procedure towards the UPF (PDU Session Anchor or another intermediate UPF) connecting to the released UPF, indicating the need to remove CN Tunnel Info for N9 tunnel of the corresponding PDU Session. In this case, the UPF connecting to the released UPF buffers the DL packets for this PDU Session or drops the DL packets for this PDU session or forwards the DL packets for this PDU session to the SMF, based on buffering instruction provided by the SMF. If the PDU Session corresponds to a LADN and the UE moved out of the LADN service area, the SMF may notify the UPF connecting to the released UPF to discard downlink data for the PDU Sessions and/or to not provide further Data Notification messages.

Otherwise, N4 Session Modification procedure may occur toward N3 terminating point.

4. If the UPF of N3 terminating point is not released in step 2, the SMF may initiate an N4 Session Modification procedure indicating the need to remove AN Tunnel Info for N3 tunnel of the corresponding PDU Session. In this case, the UPF may buffer the DL packets for this PDU Session or drop the DL packets for this PDU session or forward the DL packets for this PDU session to the SMF, based on buffering instruction provided by the SMF. If the PDU Session corresponds to a LADN and the UE moved out of the LADN service area, the SMF may notify the UPF to discard downlink data for the PDU Sessions and/or to not provide further Data Notification messages.

5. The SMF invokes the Namf_Communication_N1N2MessageTransfer service operation (PDU Session ID, N2 SM Information (N2 Resource Release Request (PDU Session ID))) to release the NG-RAN resources associated with the PDU Session.

6. The AMF may send the N2 PDU Session Resource Release Command including N2 SM information (N2 Resource Release Request (PDU Session ID)) received from the SMF via N2 to the NG-RAN.

7. The NG-RAN may issue NG-RAN specific signaling exchange (e.g. RRC Connection Reconfiguration) with the UE to release the NC-RAN resources related to the PDU Session received from the AMF in step 5. When a User Plane connection for a PDU Session is released, the AS layer in the UE indicates it to the NAS layer.

If the UE is in RRC Inactive state, this step is skipped. When the UE becomes RRC Connected state from RRC Inactive state, the NG-RAN and UE may synchronize the released radio resources for the deactivated PDU Session.

8. The NG-RAN may acknowledge the N2 PDU Session Resource Release Command to the AMF including N2 SM Resource Release Ack (User Location Information, Secondary RAT Usage Data).

9. The AMF may invoke the Nsmf_PDUSession_UpdateSMContext service operation (N2 SM Information (Secondary RAT Usage Data)) to acknowledge the Namf service received in step 5.

<Inactivity Timer>

The SMF may configure the UPF to report inactivity by providing an inactivity timer for the PDU session to the UPF during the N4 session establishment/modification procedure related to the PDU session.

The value of the inactivity timer is related to the inactivity detection time, and the inactivity detection time defines the time at which time measurement is stopped when no packets are received. The inactivity timer associated with the inactivity detection time restarts at the end of each transmitted packet.

FIG. 7 shows a UP deactivation timer.

The UP inactivity timer may include the number of seconds of inactivity monitored by the UP function (i.e., UPE).

The user plane inactivity timer IE contains the number of seconds of inactivity monitored by the UP function.

The User Plane Inactivity Timer field shall be encoded as an Unsigned32 binary integer value. The timer value "0" shall be interpreted as an indication that user plane inactivity detection and reporting is stopped.

Problems to be Solved in the Disclosure of the Present Specification

If the inactivity timer provided by the SMF is not appropriate for the PDU session, for example, if it takes too long for the UPF to detect PDU session inactivity relative to the communication pattern for the PDU session, then the PDU session may become inactive and UP resources (i.e., data radio bearers and N3 tunnels) may be allocated unnecessarily even if there is no data transmission for a while. In addition, UPF reallocation may be performed because an activated PDU session must be handled in a handover scenario. This handover process for the PDU session may be unnecessary when there is no data transmission for a while because the PDU session is inactive.

Disclosure of this Specification

Disclosures described later in this specification may be implemented in one or more combinations (e.g., a combination including at least one of the contents described below). Each of the drawings represents an embodiment of each disclosure, but the embodiments of the drawings may be implemented in combination with each other.

Description of the method proposed in the disclosure of this specification may be composed of a combination of one or more operations/configurations/steps described below. The following methods described below may be performed or used in combination or complementary.

The following drawings are made to explain a specific example of the present specification. Since the names of specific devices or names of specific signals/messages/fields described in the drawings are provided as examples, the technical features of the present specification are not limited to the specific names used in the drawings below.

It may be considered that SMF's determination of an appropriate inactivity timer for a PDU session will help to efficiently manage user plane resources resulting in UP optimization.

In the proposed solution, SMF may use the UE Communication Analytics output of NWDAF for CN-initiated selective deactivation of UP connections of existing PDU sessions.

That is, the SMF may determine i) whether to configure the UPF to report the inactivity of the established PDU session using the output of the UE Communication Analytics and ii) the inactivity timer for the PDU session provided to the UPF if reporting is required.

Figure 8:
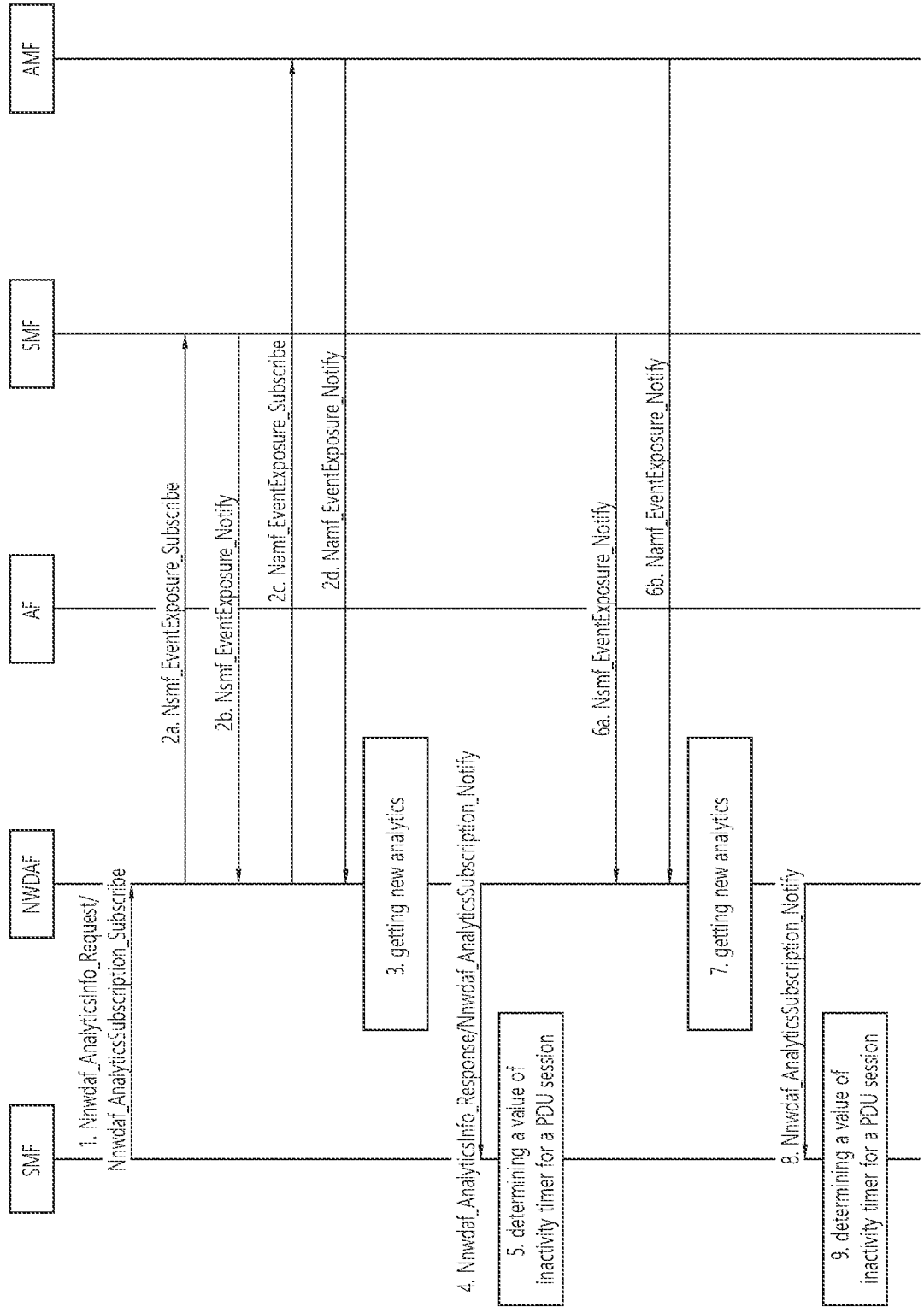
FIG. 8 shows the disclosure of this specification.

FIG. 8 shows the disclosure of this specification.

1. SMF may request or subscribe to UE Communication Analytics provided by NWDAF. Nnwdaf_AnalyticsInfo_Request may be used for the above request. Nnwdaf_AnalyticsSubscription_Subscribe may be used for the above subscription.

The message transmitted for the request or subscription may include Analytics Filter information and Target of Analytics Reporting information. DNN and S-NSSAI information may be included in the message as Analytics Filter information. One UE information (i.e., SUPI) or UE group information (i.e., Internal Group Identifier) may be included in the message as Target of Analytics Reporting information. The message transmitted for the above request or subscription may include Area of Interest information.

The message transmitted for the above request or subscription may include a request for predictions or statistics, which are analytics output.

2a-b. For providing requested analytics, NWDAF may subscribe, to SMF, for a service that provides information related to UE communication. Nrsmf_EventExposure_Subscribe may be used for the subscription. The information provided from the SMF may include information in Table 3.

TABLE 3

| Information | Description |
| --- | --- |
| UE ID | SUPI |
| Group ID | Internal Group ID |
| S-NSSAI | Information to identify a Network Slice |
| DNN | Data Network Name where PDU connectivity service is provided |
| Application ID | Identifying the application providing this information |
| UE communication (1 . . . max) | Communication description per application |
| >Communication start | The time stamp that this communication starts |
| >Communication stop | The time stamp that this communication stops |
| >UL data rate | UL data rate of this communication |
| >DL data rate | DL data rate of this communication |
| >Traffic volume | Traffic volume of this communication |

2c-d. For providing requested analytics, NWDAF may subscribe, to AMF, for a service that provides information related to Type Allocation code (TAC). Namf_EsventExposure_Subscribe may be used for the subscription.

The TAC information may include terminal model and terminal manufacturer information. The reason why TAC information is provided from AMF is that UEs having the same TAC information can have similar communication types.

3. NWDAF may compute requested analytics. In step 1, if SMF requested to provide statistics output, the UE communication analytics computed above is statistics information. If SMF requested to provide output for predictions in step 1, the UE communication analytics calculated above is predictions information.

4. NWDAF may provide UE communication analytics to SMF. If Nnwdaf_AnalyticsInfo_Request is received from SMF in step 1, NWDAF may provide the analytics information to SMF through Nnwdaf_AnalyticsInfo_Response. If Nnwdaf_AnalyticsSubscription_Subscribe is received from SMF in step 1, NWDAF may provide the analytics information to SMF through Nnwdaf_AnalyticsSubscription_Notify.

If the UE Communication analytics output/information provided by the NWDAF to the SMF is statistics information, the information in Table 4 may be included.

TABLE 4

| Information | Description |
| --- | --- |
| UE ID or UE group ID | Identifies an UE (SUPI) or a group of UEs (internal group ID). |
| UE communications (1 . . . max) | List of communication time slots. |
| > Periodic communication indicator | Identifies whether the UE communicates periodically or not. |
| > Periodic time | Interval Time of periodic communication (average and variance) if periodic. Example: every hour |
| > Start time | Start time observed (average and variance) |
| > Duration time | Duration interval time of communication (average and variance). |
| > Traffic characterization | S-NSSAI, DNN, ports, other useful information. |
| > Traffic volume | Volume UL/DL (average and variance). |
| > Ratio | Percentage of UEs in the group (in the case of an UE group). |

If the UE Communication analytics output/information provided by the NWDAF to the SMF is predictions information, the information in Table 5 may be included.

TABLE 5

| Information | Description |
| --- | --- |
| UE ID or UE group ID | Identifies an UE (SUPI) or a group of UEs (internal group ID). |
| UE communications (1 . . . max) | List of communication time slots. |
| > Periodic communication indicator | Identifies whether the UE communicates periodically or not. |
| > Periodic time | Interval Time of periodic communication (average and variance) if periodic. Example: every hour. |
| > Start time | Start time predicted (average and variance). |
| > Duration time | Duration interval time of communication. |
| > Traffic characterization | S-NSSAI, DNN, ports, other useful information. |
| > Traffic volume | Volume UL/DL (average and variance). |
| > Confidence | Confidence of the prediction. |
| > Ratio | Percentage of UEs in the group (in the case of an UE group). |

5. The SMF may determine the Inactivity Timer value of the PDU Session to be provided to the UPE based on the UE Communication analytics output/information received from the NWDAF. This decision may include a decision on whether to configure the UPF to report inactivity for the PDU Session or whether to stop the UPF from reporting inactivity for the PDU Session. By setting the Inactivity Timer value to 0, the SMF may configure the UPF not to report inactivity or to stop.

The SMF may determine whether to designate a PDU Session as an always-on PDU Session, based on the UE Communication analytics output/information received from the NWDAF.

The PDU Session is a PDU Session for DNN/S-NSSAI included in the NWDAF output.

The PDU Session may be for a specific UE or a specific group of UEs.

The PDU Session may be in an activated state in a specific region (cells, TAs, UPF serving area, etc.).

For example, if the UE communication related to S-NSSAI/DNN (that is, the communication characteristics/pattern of PDU Session related to S-NSSAI/DNN) is periodic and the period is long, the Inactivity Timer for the corresponding PDU Session is determined with a small value. By providing this to the UPF, the UPF may detect inactivity within a short time after communication is terminated and report it to the SME. As another example, if UE communication related to S-NSSAI/DNN is not periodic, an inactivity timer for the corresponding PDU session may be determined as a large value and provided to the UPF. This is to prevent prematurely deactivating the user plane of the PDU Session due to the report of inactivity by the UPF when the Inactivity Timer is set to a small value and provided to the UPF. As another example, if the period of UE communication related to S-NSSAI/DNN is very small, the UPF may be configured not to report inactivity or stopped.

6-8. If NWDAF has received Nnwdaf_AnalyticsSubscription_Subscribe from SMF in step 1, NWDAF may compute new analytics based on information provided from SMF and/or AMF (information described in step 2). And, the newly computed analytics information may be provided to SMF through Nnwdaf_AnalyticsSubscription_Notify.

9. Same as the above 5 steps.

When the SMF determines the Inactivity Timer value of the PDU Session, the SMT may provide it to the UPF. The provision may be performed during the procedure of PDU Session Establishment or PDU Session Modification.

As described above, when SMF performs UP (User Plane) optimization using NWDAF analytics, UE Communication Analytics may be extended and used, and other analytics (e.g., UE mobility analytics, User Data Congestion Analytics) together with or in addition to UE Communication Analytics may also be used.

When an SMF subscribes to or requests NWDAF analytics for UP optimization, it may always do so, or it may be performed based on various conditions/reasons as shown below. However, the subscription/request may be performed based on various circumstances without being limited thereto.

RAN congestion information (e.g., notification information received from NG-RAN according to QNC (QoS Notification Control))

Handover result (e.g. accepted PDU Sessions/QoS Flows, rejected PDU Sessions/QoS Flows information at the time of handover)

Figure 9:
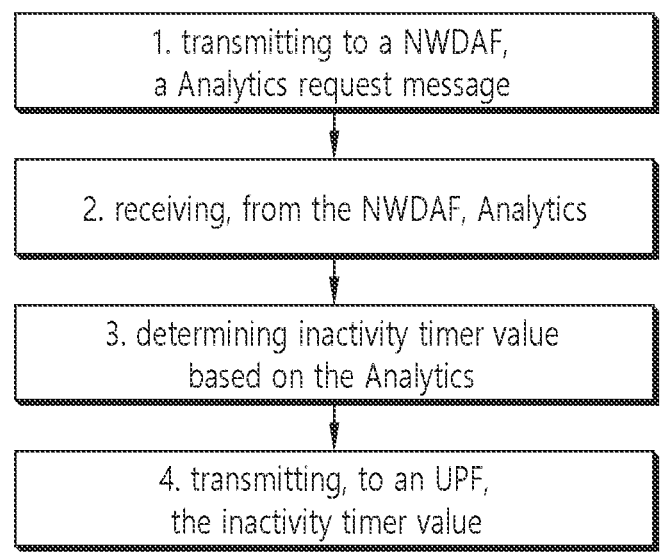
FIG. 9 shows a procedure of SMF according to the disclosure of the present specification.

When the SMF determines that the number of PDU sessions created or the number of PDU sessions released has reached a threshold in relation to a certain DN-N/S-NSSAI and/or in a certain region FIG. 9 shows a procedure of SMF according to the disclosure of the present specification.

1. SMF may send a message requesting analytics to NWDAF.

The requested analytics may be UE Communication Analytics.

The message may include DNN and S-NSSAI. DNN and S-NSSAI may be related to a specific session (PDU session).

The Analytics request message may include Subscription Permanent Identifier (SUPI) information, Internal Group Identifier information, and Area of Interest information.

2. SMF may receive analytics from NWDAF.

The analytics may be related to the specific session described above in step 1.

3. The SMF may determine a inactivation timer value based on analytics.

The inactivity timer value may be related to the specific session. An appropriate inactivation timer value suitable for characteristics of a session may be set.

The inactivation timer value may be zero.

4. The SMF may transmit the inactivation timer value to the UPF.

When there is no data transmission for the specific session for a time corresponding to the inactivity timer value, the UPF may detect this and notify the SMF.

When the SMF recognizes that there is no data transmission for the specific session for a time corresponding to the inactivation timer value, the SMF may terminate the specific session (i.e., deactivate the UP connection).

SMF may receive new Analytics from NWDAF.

A new inactivation timer value may be determined based on the new Analytics.

The new inactivation timer value may be transmitted through UPF

Figure 10:
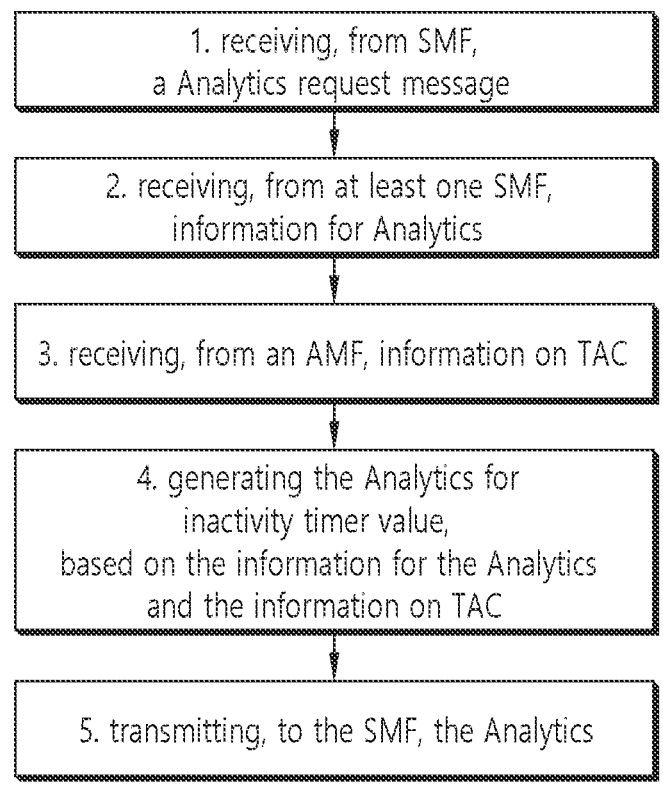
FIG. 10 shows a procedure of NWDAF according to the disclosure of this specification.

FIG. 10 shows a procedure of NWDAF according to the disclosure of this specification.

1. NWDAF may receive a message requesting analytics from SMF.

The requested analytics may be UE Communication Analytics.

The Analytics request message may include DNN and S-NSSAI. DNN and S-NSSAI may be related to a specific session (PDU session).

The Analytics request message may include Subscription Permanent Identifier (SUPI) information, Internal Group Identifier information, and Area of Interest information.

2. NWDAF may receive information for analytics from at least one SMF.

NWDAF may request information for analytics from at least one SMF and receive it as a response. The SMF of step 1 may correspond to one of the at least one SMF 3. NWDAF may receive TAC information from AMF.

4. NWDAF may generate analytics based on the information for analytics and the TAC information.

5. NWDAF may transmit the generated analytics to the SMF that requested the analytics.

NWDAF may receive information for new Analytics from the at least one SMF.

NWDAF may receive new TAC information from the AMF.

NWDAF may create new Analytics based on the information for the new Analytics and the new TAC information.

NWDAF may transmit the new Analytics to the SMF.

The specification may have various effects.

For example, through the procedure disclosed herein, the SMF may determine an appropriate inactivity timer for the PDU session to efficiently manage user plane resources to provide an optimized UP.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method. Other implementations are within the scope of the following claims.

What is claimed is:

1. A method for performing communication, performed by a SMF (Session Management Function), the method comprising:
    transmitting, to a NWDAF (Network Data Analytics Function), a request for Analytics,
    wherein the request for Analytics includes DNN (Data Network Name) and S-NSSAI (Single Network Slice Selection Assistance Information);
    receiving, from the NWDAF, Analytics;
    determining a value of inactivity timer for a PDU (Packet Data Unit) session based on the Analytics;
    transmitting, to an UPF (User Plane Function), the value of inactivity timer;
    receiving, based on no data transfer in the PDU session corresponding to the DNN and the S-NSSAI for a period of the value of inactivity timer, a message indicating inactivity of the PDU session from the UPF; and
    deactivating UP connection of the PDU session, based on the message.

2. The method of claim 1,
    wherein the Analytics is UE Communication Analytics.

3. The method of claim 1,
    wherein the request for Analytics includes SUPI (Subscription Permanent Identifier) information or Internal Group Identifier information.

4. The method of claim 1,
    wherein the request for Analytics includes information on Area of Interest.

5. The method of claim 1,
    wherein the determining the value of inactivity timer comprises: determining the value of inactivity timer as 0 for i) configuring the UPF not to report inactivity or ii) stopping the UPF to report inactivity.

6. The method of claim 1, further comprising:
    receiving, from the NWDAF, new Analytics;
    determining new value of inactivity timer, based on the new analytics; and
    transmitting, to the UPF, the new value of inactivity timer.

7. A method for performing communication, performed by a NWDAF (Network Data Analytics Function), the method comprising:
    receiving, from SMF (Session Management Function), a request for Analytics,
    wherein the request for Analytics includes DNN (Data Network Name) and S-NSSAI (Single Network Slice Selection Assistance Information);
    receiving, from at least one SMF, information for Analytics;

receiving, from an AMF (Access and Mobility Management Function), information on TAC (Type Allocation Code);
generating the Analytics for inactivity timer, based on the information for the Analytics and the information on TAC; and
transmitting, to the SMF, the Analytics.

8. The method of claim 7,
wherein the Analytics is UE Communication Analytics.

9. The method of claim 7,
wherein the request for Analytics includes SUPI (Subscription Permanent Identifier) information or Internal Group Identifier information.

10. The method of claim 7,
wherein the request for Analytics includes information on Area of Interest.

11. The method of claim 7,
wherein a value of the inactivity timer is to be 0 i) for configuring a UPF (User Plane Function) not to report inactivity or ii) for stopping the UPF to report inactivity.

12. The method of claim 7, further comprising:
receiving, from the at least one SMF, information for new Analytics;
receiving, from the AMF, information on new TAC;
generating new Analytics for inactivity timer, based on the information for new Analytics and the information on new TAC; and
transmitting, to the SMF, the new Analytics.

13. A method for performing communication, performed by a base station, the method comprising:
receiving, from an AMF (Access and Mobility Management Function), a resource release command for a PDU (Packet Data Unit) session; and
transmitting, to the AMF, a resource release response for the PDU session, based on the resource release command,
wherein the resource release command is based on that a SMF (Session Management Function) receives a message indicating inactivity of the PDU session during a value of inactivity timer from a UPF (User Plane Function), and
wherein the value of inactivity timer is determined by the SMF, based on Analytics from a NWDAF (Network Data Analytics Function).

* * * * *